United States Patent
Shaffer et al.

[11] Patent Number: 5,995,594
[45] Date of Patent: *Nov. 30, 1999

[54] SYSTEM AND METHOD FOR MESSAGE NOTIFICATION IN A MULTIMEDIA MESSAGING SYSTEM

[75] Inventors: Shmuel Shaffer, Palo Alto; William Joseph Beyda, Cupertino, both of Calif.

[73] Assignee: Siemens Information and Communication Networks, Inc., Boca Raton, Fla.

[ * ] Notice: This patent issued on a continued prosecution application filed under 37 CFR 1.53(d), and is subject to the twenty year patent term provisions of 35 U.S.C. 154(a)(2).

[21] Appl. No.: 08/748,305

[22] Filed: Nov. 13, 1996

[51] Int. Cl.$^6$ ...................................................... H04M 1/64
[52] U.S. Cl. ........................ 379/88.12; 379/67.1; 379/82; 379/88.01; 379/88.18
[58] Field of Search ................................. 379/67, 88, 89, 379/67.1, 72, 76, 82, 83, 85, 88.01, 88.13, 88.17, 88.18, 88.22, 88.12

[56] References Cited

U.S. PATENT DOCUMENTS

| | | | |
|---|---|---|---|
| 4,113,986 | 9/1978 | Clement et al. | 379/102.06 |
| 4,560,837 | 12/1985 | Carson et al. | 379/212 |
| 4,757,525 | 7/1988 | Matthews et al. | 379/89 |
| 4,766,604 | 8/1988 | Axberg | 379/67 |
| 4,809,321 | 2/1989 | Morgenstein et al. | 379/211 |
| 4,856,055 | 8/1989 | Schwartz | 379/374 |
| 4,969,186 | 11/1990 | Sayre, II | 379/376 |
| 5,033,077 | 7/1991 | Bergeron et al. | 379/67 |
| 5,200,994 | 4/1993 | Sasano et al. | 379/142 |
| 5,400,393 | 3/1995 | Knuth et al. | 379/88 |
| 5,404,231 | 4/1995 | Bloomfield | 358/400 |
| 5,481,594 | 1/1996 | Shen et al. | 379/67 |
| 5,577,104 | 11/1996 | Knuth et al. | 379/67 |
| 5,649,007 | 7/1997 | Yamada | 379/373 |

FOREIGN PATENT DOCUMENTS

| | | | |
|---|---|---|---|
| 0 588 101 A2 | 3/1994 | European Pat. Off. | H04M 3/50 |
| 0 691 777 A2 | 1/1996 | European Pat. Off. | H04M 3/50 |
| 2 294 608 | 5/1996 | United Kingdom | H04M 3/50 |
| 2 301 260 | 11/1996 | United Kingdom | H04M 3/50 |

*Primary Examiner*—Fan S. Tsang
*Assistant Examiner*—Allan Hoosain
*Attorney, Agent, or Firm*—Heather S. Vance

[57] ABSTRACT

According to the invention, a system and method are provided for notifying a user of an awaiting message. The awaiting message is located in a user mailbox (24). User (10) is first provided with notification. This notification is different for different types of messages. The notification to user (10) is repeated if user (10) fails to respond to it. The repeating occurs until user (10) responds to the notification, and the repeating takes place after a predetermined period of time. User (10) is then informed of the awaiting message located in user mailbox (24).

11 Claims, 4 Drawing Sheets

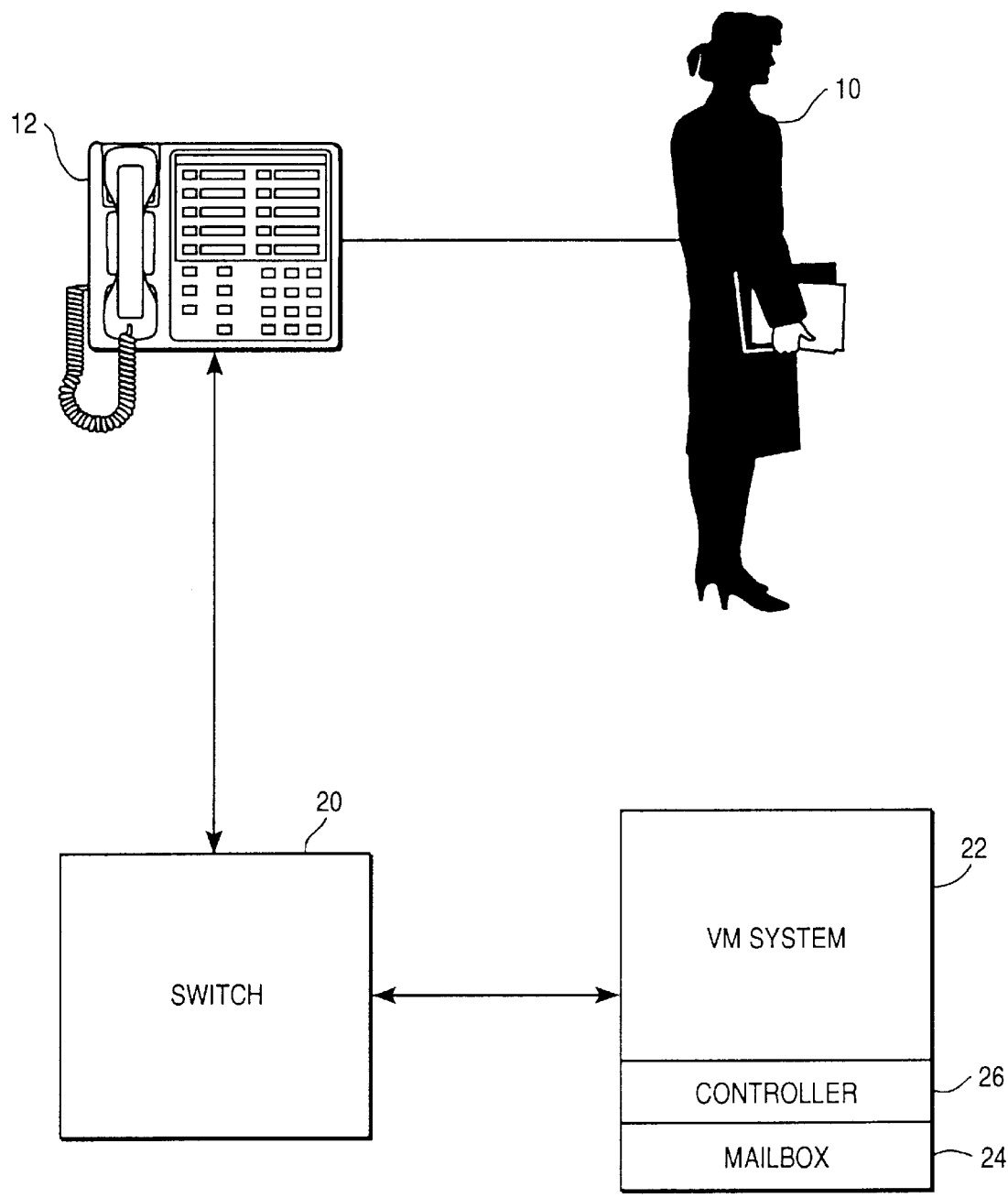
FIG_1

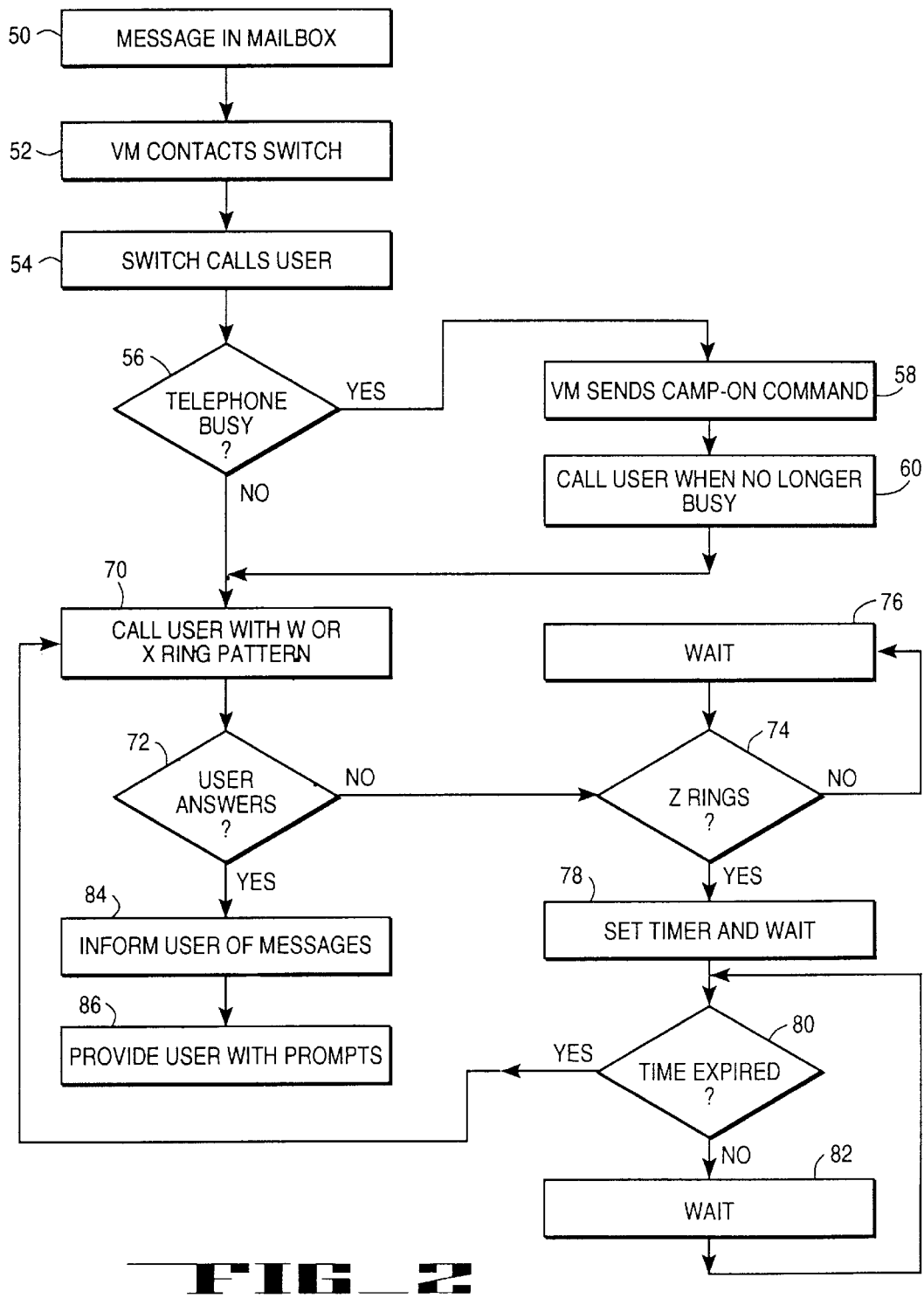
FIG_2

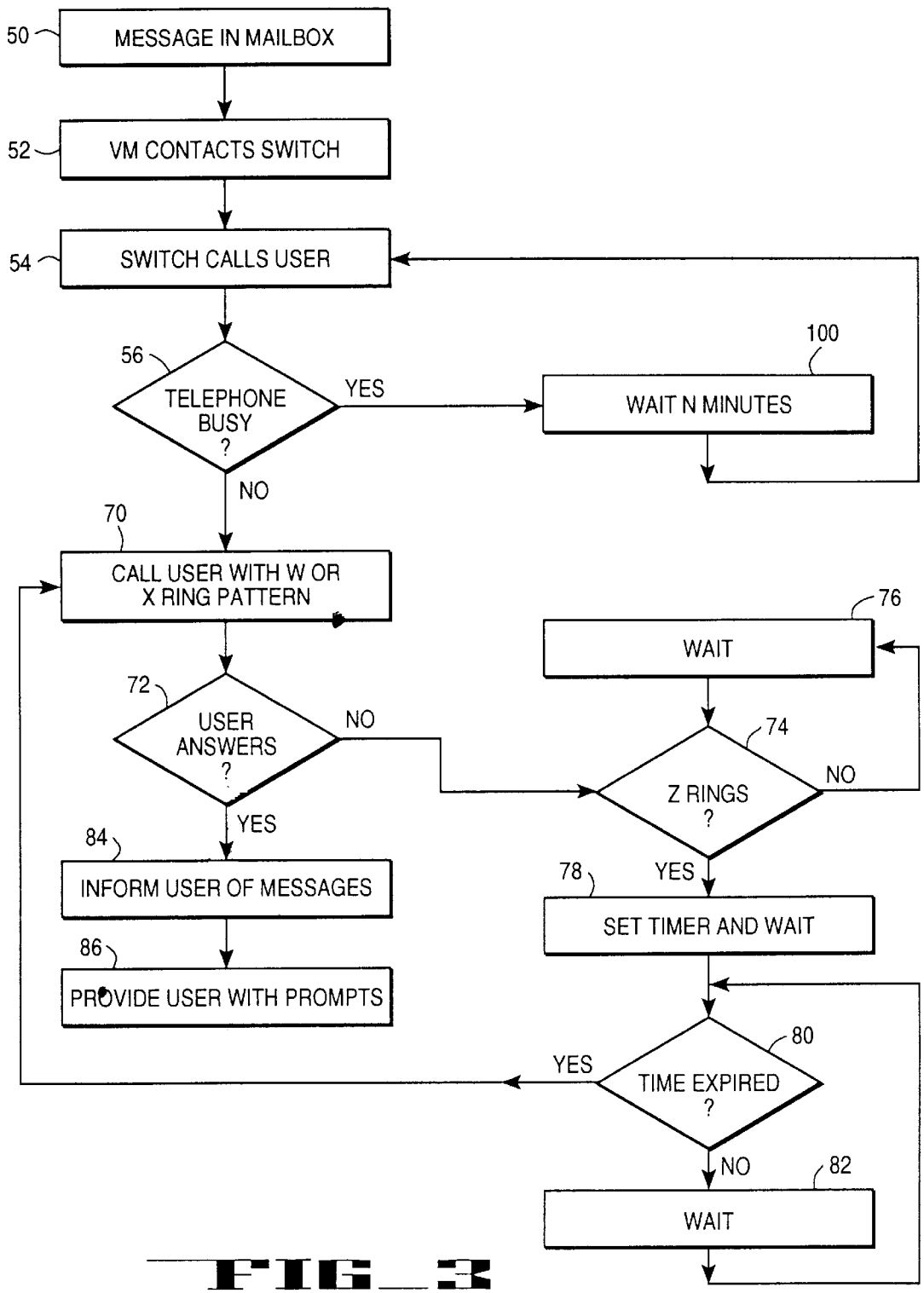
FIG_3

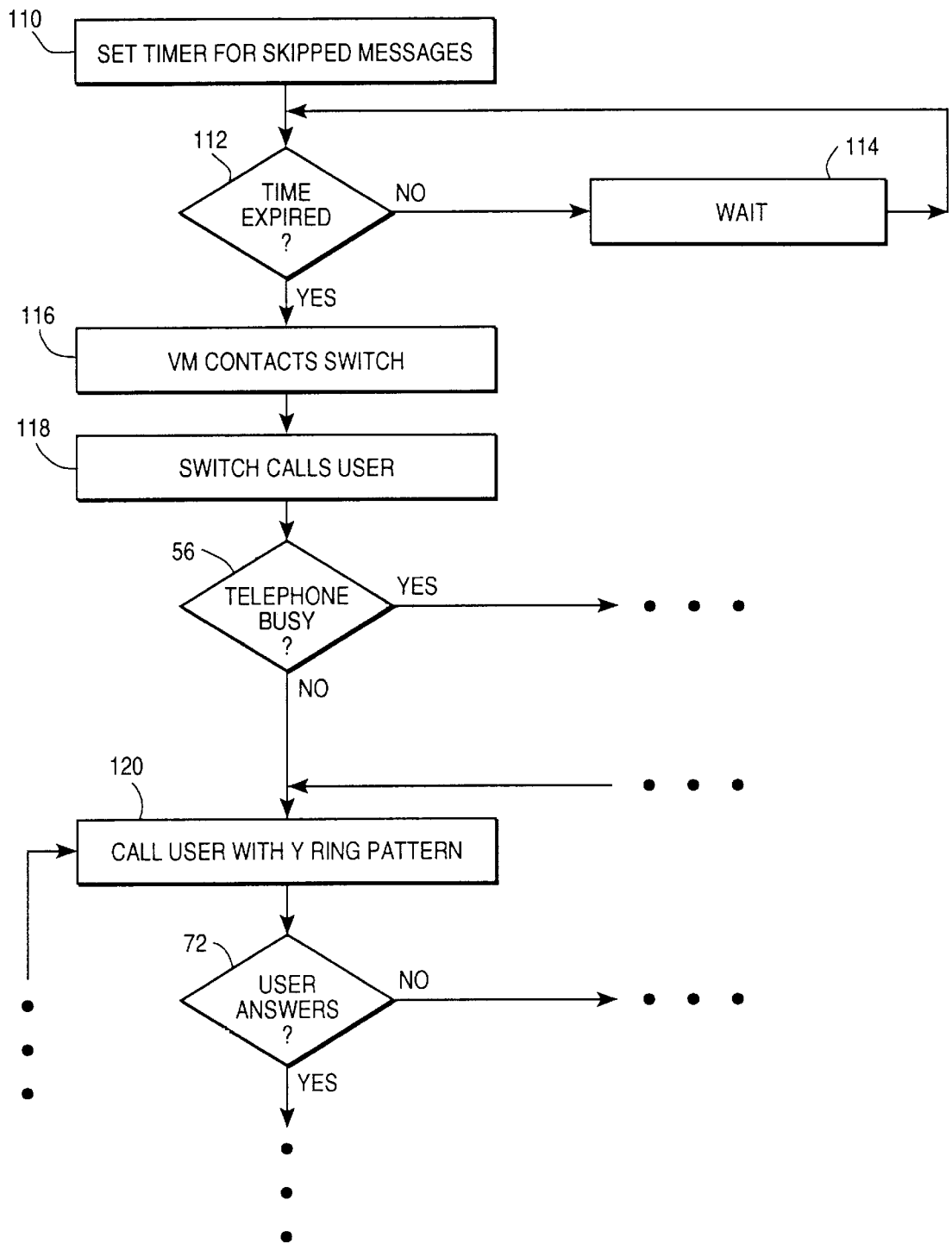
FIG_4

SYSTEM AND METHOD FOR MESSAGE NOTIFICATION IN A MULTIMEDIA MESSAGING SYSTEM

BACKGROUND OF THE INVENTION

1. Field of the Invention

The invention relates to providing a multimedia messaging system and related method for notifying users of messages located in their message mailboxes.

2. Description of the Related Art

Current voice mail systems and related switches provide a variety of features. For example, the camp-on and the automated redial features are common. These features are utilized when a called line is busy. Usually a switch (e.g., private branch exchange) monitors the busy line. Usually, a caller activates the camp-on feature when the caller hears a busy signal or when a caller is automatically forwarded to a voice mail system. When the called party's line becomes available, the switch rings the caller's telephone with a distinctive ring indicating a camp-on is in progress. When the caller then picks up the receiver on the telephone, the switch places another call to the called party. Usually, the line is no longer busy and the caller is transferred to the called party. If the line is busy again, the caller hears the busy signal or is automatically transferred to a voice mail system, and the user can camp-on again. A voice mail system can be used to initiate this feature. For example, if the caller is automatically transferred to the called party's voice mail system (this may be an automatic result when the line is busy), the caller may be able to enter a code (e.g., #1) to initiate a camp-on. In this arrangement, the voice mail system sends a message to the switch such that the switch performs the camp-on. Software located in the switch is used to provide this camp-on feature.

Similarly, the automated redial feature can be utilized when a busy line is detected. The automated redial feature is usually used in place of the camp on feature when the caller and the called line (1) have different and separate switches or (2) have switches which are connected via a dumb connection. If a smart connection is available between the switches (e.g., via an ISDN line), the regular camp-on feature can be used. In a first example of automated redial, the caller's switch continually calls the called line until a ring signal is obtained. The caller's switch then (1) rings the caller and transfers the caller to the called line or (2) automatically transfers the caller to the called line. In a second example of automated redial, the caller's switch continually calls the called line until the called party answers the called telephone. The called party then receives an automated message (e.g., "please hold for Mr. Smith") and then is transferred to the caller. Automated redial is provided by software located in, for example, a fax machine.

In addition to camp-on and automated redial, the outcalling feature is becoming popular. With outcalling, a user is notified of awaiting messages via a pager. For example, a user can program their message mailbox such that when an urgent message is received, the user's pager is dialed. Depending on the type of page, a numeric or alphanumeric description of the message can also be sent to the user. Thus, the user is immediately contacted regarding the urgent message with relevant details.

Message waiting lights and stutter dial tones are currently the prevalent means for message notification in the voice mail environment. Private branch exchanges (PBX) with message waiting lights on their analog or digital telephones are able to display message notification to a user by illuminating the message waiting lights. Most voice mail manufacturers offer proprietary and standard protocols for providing this notification from the PBX to their digital telephones. For example, standard digital telephones (e.g., ISDN telephones) are notified to turn on their message waiting lights using standard protocols. Similarly, proprietary digital telephones (e.g., RolmPhones™ digital telephones, commercially available from Siemens Business Communications, Inc.) use propriety protocols (e.g., the RolmLink™ protocol).

In a public central office, the ability to send message waiting signals to analog telephones is limited. Thus, most systems use a stutter dial tone to notify a user of an awaiting message. This requires the user to pick up the telephone receiver and listen to the dial tone to determine if any awaiting messages are present. Both message waiting lights and stutter dial tones require the user to proactively check for messages. Moreover, these notification methods do not distinguish between new and skipped messages.

When a PBX is utilized, the user must check the message waiting light. If the user has been on the telephone, the user may hang up after finishing a telephone call without noticing the message waiting light. In addition, new messages can arrive on top of a mailbox's skipped messages with no additional notification. In the public central office situation, a user arriving at, for example, their home or business is given no visual indication of an awaiting message. This user must remember to pick up the telephone receiver and listen to the dial tone. Also, if a public central office user is on the telephone, the user may hang up the telephone after finishing a call without remembering to pick up the telephone receiver again to check for messages.

It is desirable to have an inexpensive, reliable system and related method for notifying users of awaiting messages which supplements or eliminates the need for message waiting lights and stutter dial tones.

SUMMARY OF THE INVENTION

According to the invention, a system and method are provided for notifying a user of an awaiting message. The awaiting message is located in a user mailbox. The user is first provided with notification. This notification is different for different types of messages, and it is repeated if the user fails to respond to it. The repeating occurs until the user responds to the notification, and the repeating takes place after a predetermined period of time. The user is then informed of the awaiting message located in their mailbox.

BRIEF DESCRIPTION OF THE DRAWINGS

FIG. 1 illustrates an example of an environment for the present invention;

FIG. 2 is a process flowchart for a first embodiment of the notification system;

FIG. 3 is a process flowchart for a second embodiment of the notification system; and FIG. 4 is a process flowchart for an embodiment of the present invention which provides notification of skipped messages.

DETAILED DESCRIPTION

The present invention provides a multimedia messaging system and related method for notifying multimedia users of messages located in their mailboxes. The present invention supplements or eliminates the need for message waiting lights and stutter dial tones. Voice mail is used as an example in the present embodiment. This invention can also be used in any other type of multimedia messaging system (e.g., facsimile, e-mail, video and/or any other type of message via any available media).

FIG. 1 illustrates an example of an environment for the present invention. User 10 has access to telephone 12 which is connected to switch 20. Switch 20 can be, for example, a PBX or a central office switch. A PBX is a telecommunications switching system which is usually owned by a business. A PBX acts as an in-house central office with advanced features and capabilities. A central office is where the central office switch is located. A central office switch provides power, routing and signaling features for users.

Voice mail system 22 is connected to switch 20. User 10 has a message mailbox 24 located within voice mail system 22. Controller 26 is also located in voice mail system 22. In the preferred embodiment, controller 26 provides the coordination of events required for the present invention. Software programs located in both switch 20 and voice mail system 22 are also used to provide the present invention. The coordination of events utilizing these software programs is set forth in the following process flowcharts.

FIG. 2 is a process flowchart for a first embodiment of the notification system. At step 50, a message is detected in mailbox 24 (see FIG. 1). At step 52, voice mail system 22 contacts switch 20 about the message. At step 54, switch 20 places a call to user 10 via telephone 12. At step 56, if telephone 12 is busy (e.g., user 10 is using telephone 12 or another call is ringing telephone 12), the system moves to step 58. Steps 58 and 60 are optional. An alternative embodiment for steps 58 and 60 is set forth below. At step 58, voice mail system 22 receives notification of the busy signal from switch 20, and voice mail system 22 sends a camp-on command to switch 20. By utilizing ISDN features, this camp-on can be used wherever ISDN connections are available (i.e., all over the nation and to other countries where available). ISDN provides for a digital network which carries both voice and data communications.

At step 60, user 10 is called again via telephone 12 when telephone 12 is no longer busy. Steps 58 and 60 are desirable for several reasons. For example, if a user 10 receives a message while on telephone 12, (1) user 10 may not notice a message waiting light or (2) user 10 might forget to listen for a stutter dial tone after hanging up telephone 12. With steps 58 and 60, switch 20 camps on user's 10 line and calls user 10 as soon as user 10 hangs up telephone 12. Furthermore, some users receive caller identification on their telephones. Under these circumstances, a user can avoid answering the telephone when an undesirable, identified party calls. While the user may want to avoid a certain caller, the user may still want notification of awaiting messages. Thus, steps 58 and 60 provide notification as soon as the undesirable caller has left a message in a voice mail system.

When telephone 12 is not busy, the process moves to step 70. At step 70, the system rings telephone 12 using a specific ring pattern. This ring pattern notifies user 10 that the call is related to awaiting telephone messages in mailbox 24. In another embodiment of the invention, various ring patterns can be used to identify different types of messages. For example, a W ring pattern may identify regular messages, and an X ring pattern may identify urgent messages. An urgent message is tagged with priority when an individual leaves that message for user 10. By utilizing different ring patterns, user 10 can decide whether to answer telephone 12 based on the type of awaiting message(s) in mailbox 24. In addition to the various ring patterns, a different number of rings can be used to specify the length of notification for each type of message. The number of rings can be preprogrammed by user 10. Thus, the user can control the length of the notifying telephone call.

In some cases, the line may become busy again before the call is placed to the user at step 70. For example, the user may hang up for an instant and then immediately place another call. In this situation, the system returns to step 58 and performs another camp-on. This continues until the line is no longer busy and a call is successfully placed to the user at step 70.

At step 72, the system checks if user 10 has answered telephone 12. If user 10 has not answered telephone 12, the system checks the number of telephone rings at step 74. If user 10 has not answered telephone 12 and less than Z rings (e.g., 8 rings) have occurred, the system waits at step 76. Z is a configurable number which can be inputted by user 10. This input can occur via voice mail prompts provided by voice mail system 22. In an alternative embodiment, user 10 can use a special telephone number to change the value of Z. The waiting at step 76 and the checking at step 74 continues until Z rings have taken place. At step 78, the system sets a timer and waits. For example, the timer may be set for 30 minutes. Again, user 10 can change this amount of time. At step 80, the system checks if the set time has expired. If the time has not expired, the system waits at step 82. This continues until the set time expires. The system then returns to step 70, and user 10 is called with the specific ring pattern again. This continues until user 10 answers telephone 12. Thus, user 10 may receive a message notification telephone call, for example, every 30 minutes.

When user 10 answers telephone 12, the system informs user 10 of the message(s) in mailbox 24 at step 84. At step 86, the system provides user 10 with prompts such that user 10 can easily retrieve the message(s) in mailbox 24. For example, voice mail system 22 may prompt user 10 for an identification code and/or password, etc.

FIG. 3 is a process flowchart for a second embodiment of the notification system. As shown in FIG. 3, steps 50–56 and 70–86 are the same as those steps in FIG. 2. Steps 58 and 60 (see FIG. 2) have been replaced with step 100. At step 100, the system waits a predetermined amount of time (e.g., 30 or N minutes) before placing another call to user 10 via telephone 12. Again, the user can change this predetermined amount of waiting time. Thus, the automated redial feature is utilized instead of the camp-on feature.

When listening to voice mail messages, especially when message mailbox 24 is quite full and user 10 is short of time, it is common to listen to the header, determine who sent the message and skip it for later listening. For example, user 10 may only listen to three out of six messages because of time constraints. FIG. 4 is a process flowchart for an embodiment of the present invention which provides notification of skipped messages. FIG. 4 is similar to FIG. 2. Steps 56 and 72 the same as those steps in FIG. 2. Steps 58–60 and 74–86 are also the same as those in FIG. 2, but they are not shown in FIG. 4. Steps 50–54 have been replaced with steps 110–118, and step 70 has been replaced with step 120. At step 110, the timer is set for notifying user 10 of skipped messages. Thus, if user 10 skips some messages and leaves them in mailbox 24, a configurable timer is set. The user can determine this configurable redial time (e.g., 1 hour) as set forth above. At step 112, the system checks if the time has expired. If the time has not expired, the system waits at step 114. When the time has expired, the system moves to step 116. At step 116, the voice mail messaging system contacts the switch about the skipped messages. At step 118, the switch calls user 10. When telephone 12 is busy, either the camp on feature (see FIG. 2 along with related description) or the automatic redial feature (see FIG. 3 along with related description) can be utilized. When telephone 12 is not busy, the user 10 is contacted via telephone 12 with a different ring pattern (e.g., Y ring pattern) at step 120. Therefore, configurable redial times as well as distinctive ringing can be used to notify user 10 of different types of messages (e.g., new or skipped messages).

The different ring patterns allow the user to decide whether or not to answer the message notifying call based on the types of awaiting messages. In current systems, when a message waiting light is already "on" due to skipped messages, the user cannot determine if new messages have been received without contacting the voice mail system. For example, if someone records and sends a message to the user from inside the voice mail system, the user's telephone never rings. The message is just added to the queue of skipped messages. Therefore, the user would not know if another, new message has been added to the user's mailbox. With the present invention, the user would receive a call from the system informing the user of the arrival of a new message.

We claim:

1. A method for notifying a user of an awaiting message, the awaiting message being stored in a user mailbox, comprising the following steps:

a) providing ring signal notification to the user, the notification being different for different types of stored messages;

b) repeating step a) until the user responds to the notification, the repeating taking place at predetermined time intervals;

c) when the user responds to the notification, providing the user access to the awaiting message stored in the user mailbox; and d) camping-on a line, the line being connected to a switch, the camping-on occurring when a busy signal is received by the switch from the line.

2. The method of claim 1 for notifying a user of an awaiting message, wherein the notification is a telephone ring pattern.

3. The method of claim 2 for notifying a user of an awaiting message, wherein the telephone ring pattern is different for different types of stored messages, the different types of stored messages including at least one of normal messages, skipped messages and urgent messages.

4. The method of claim 1 for notifying a user of an awaiting message, wherein the stored message is at least one of a telephone message, a facsimile message, an e-mail message and a video message.

5. A method for notifying a user of an awaiting message, the awaiting message being stored in a user mailbox, comprising the following steps:

a) providing notification to the user, the notification being one of at least two telephone ring patterns, at least one of the telephone ring patterns indicating the type of awaiting message stored in the user mailbox;

b) repeating step a) until the user responds to the notification, the repeating taking place after predetermined time intervals; and c) when the user responds to the notification, providing the user access to the awaiting message stored in the user mailbox.

6. The method of claim 5 for notifying a user of an awaiting message, further comprising the step of camping-on a line, the line being connected to a switch and a telephone, the camping-on occurring when a busy signal is received by the switch from the line.

7. A notification system, comprising:

a switch;

a mailbox containing an awaiting message, the mailbox being associated with a user;

contact means for contacting the user; and notification means for providing notification to the user of the message in the mailbox, the notification means being coupled to the switch and the contact means;

wherein the notification means has at least two modes of notification, at least one of the two modes of notification indicating a type of message located in the mailbox; and further wherein the notification means is a distinctive ring pattern of the telephone.

8. The notification system of claim 7, wherein the switch is at least one of a PBX and a central office.

9. The notification system of claim 7, wherein the stored message is at least one of a telephone message, a facsimile message, an e-mail message and a video message.

10. The notification system of claim 7, wherein if the contact means is busy, the switch performs a camp-on function such that the notification means is provided as soon as the contact means becomes available.

11. The notification system of claim 7, wherein the telephone ring pattern is different for different types of stored messages, the different types of stored messages including at least one of normal messages, skipped messages and urgent messages.

* * * * *